United States Patent [19]

Binner

[11] 4,166,238
[45] Aug. 28, 1979

[54] CONTROL SYSTEM FOR DUAL-MOTOR DRIVE

[76] Inventor: Tihamer S. Binner, 304 West Point Ave., Somerset, N.J. 08873

[21] Appl. No.: 845,835

[22] Filed: Oct. 27, 1977

[51] Int. Cl.² .............................................. H02P 7/68
[52] U.S. Cl. ...................................... 318/67; 318/77
[58] Field of Search ....................... 318/51, 59, 66, 67, 318/77

[56] References Cited

U.S. PATENT DOCUMENTS

| | | | |
|---|---|---|---|
| 1,381,163 | 6/1921 | Heckman et al. | 318/51 |
| 2,422,117 | 6/1947 | Mercier | 318/51 |
| 3,575,648 | 4/1971 | Ridding | 318/59 X |
| 3,832,616 | 8/1974 | Vinner | 318/67 X |

Primary Examiner—B. Dobeck
Attorney, Agent, or Firm—Richard L. Miller

[57] ABSTRACT

A control system for a dual-wheel drive which includes two drive motors independently controllable by regulating the amount of current which flows to each of the motors. Two contact means are provided wherein one is a rotatable wiper arm system and the other is a pivotable plate system. A control motor continuously moves one of these two contacts while a drive wheel selectively moves the other contact. One of the contacts serves as a common electrical supply terminal for both of the drive motors while the other contact has separate terminals respectively coupled to each of the two drive motors to supply them with current. The contact relationships between the two contacts are selectively controlled by means of the drive wheel whereby the amount of current directed to flow in each of the two motors is controlled.

10 Claims, 4 Drawing Figures

CONTROL SYSTEM FOR DUAL-MOTOR DRIVE

BACKGROUND OF THE INVENTION

This invention relates to two motor drive systems, and more particularly to a control system for controlling the operation of the two motors in a dual wheel drive.

In many applications two motors are utilized to drive the apparatus. For example, in a power lawn mower, it is quite frequent to have separate and independent motors driving each of the drive wheels. Specifically, one motor drives the left wheel and a separate motor drives the right wheel. The two motors are controlled independently so that one of the motors can be caused to rotate faster than the other or, in some instances, in a reverse direction to the other motor. Such independent control of the two motors is important when desiring to turn in a direction or where one wheel is contacting a different type of surface material than the other wheel and must provide greater torque or speed in order to operate on its surface.

The same situation occurs in other types of drive systems as for example tractors, electric trucks, golf carts, and other similar vehicles. Also, in many toys there are provided separate motors for driving the left and right wheels.

While numerous systems are available for controlling such dual wheel drive systems, these have generally been found to be most complex, expensive, and resulting in costly manufacturing procedures and difficult repair situations.

SUMMARY OF THE INVENTION

It is accordingly an object of the present invention to provide a control system for a dual wheel drive which avoids the aforementioned problems of prior art devices.

A further object of the present invention is to provide an improved control system for a dual motor drive.

Yet another object of the present invention is to provide a control system for a two motor drive which is simple in construction and easy to manipulate.

Another object of the present invention is to provide a control system for a two motor drive which includes a drive wheel which can simplify operation for directional turning of the system and synchronize the direction of turn of the drive wheel with the direction of movement of the vehicle.

Yet a further object of the present invention is to provide a control system for a dual wheel drive which is simple in manufacture, efficient in operation, easy to repair, and comprises few operating components.

Briefly, the invention comprises a control system for a dual wheel drive having two drive motors which are independently controllable by regulating the amount of current supplied to each of these motors. First and second contact means are provided wherein each contact means has its own direction of movement relative to the other contact means. The first contact means serves as a common electrical supply terminal for both the first and second drive motors. The second contact means has separate terminal means respectively coupled to the first and second drive motors to supply them with current. A control motor continuously moves the first contact means. A drive wheel and related control means slectively moves the second contact means with respect to the first contact means. In this manner, the separate terminal means are selectively positioned with respect to the common supply terminal to thereby regulate the amount of current flowing to each drive motor.

In a first embodiment, the first contact means is an elongated wiper arm which is rotated about its axis by means of the control motor. The second contact means is a plate which can be pivoted with respect to the rotating wiper arm by means of the drive wheel. As the drive wheel is turned, it selectively controls the contact relationship between the plate and the rotating wiper arm to thereby control the amount of current respectively sent to each of the two drive motors.

In a second embodiment, the first contact means comprises a plate which can be pivoted about a fixed axis and which is caused to vibrate about the axis by means of the control motor. The second contact means comprises a wiper arm system which is under control of the drive wheel to rotate it with respect to the vibrating plate. Again, turning of the drive wheel selectively controls the contact relationship between the wiper arm system and the vibrating plate whereby the amount of current sent to each of the drive motors can be selectively controlled.

The aforementioned objects, features and advantages of the invention will, in part, be pointed out with particularity, and will, in part, become obvious from the following more detailed description of the invention taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

In a typical dual wheel drive, there is provided a separate drive motor for the left wheel and a separate drive motor for the right wheel. These motors are independently controlled to operate at an appropriate speed to drive their respective wheels. For example, in making a left turn on such a dual wheel driven vehicle, the left drive motor should be slowed down in speed, or even stopped, while the right drive motor continues, or speeds up with respect to the left drive motor. Additionally, the motors can be operated in reverse so that in order to make a left turn, the left motor can be operated in reverse with the right motor stopped or continued in a forward direction.

Such individual control of the two drive motors is necessary in order to achieve proper directional control of a vehicle powered with such dual wheel drive. However, the operation of the vehicle must be controlled by means of the usual drive wheel, such as a steering wheel, so that as the steering wheel is turned left, the motors respond appropriately to make the vehicle turn left. Similarly, for right turns the rotating of the steering wheel toward the right should control the motors appropriately to achieve such direct right turn movement of the vehicle.

Figure 1:
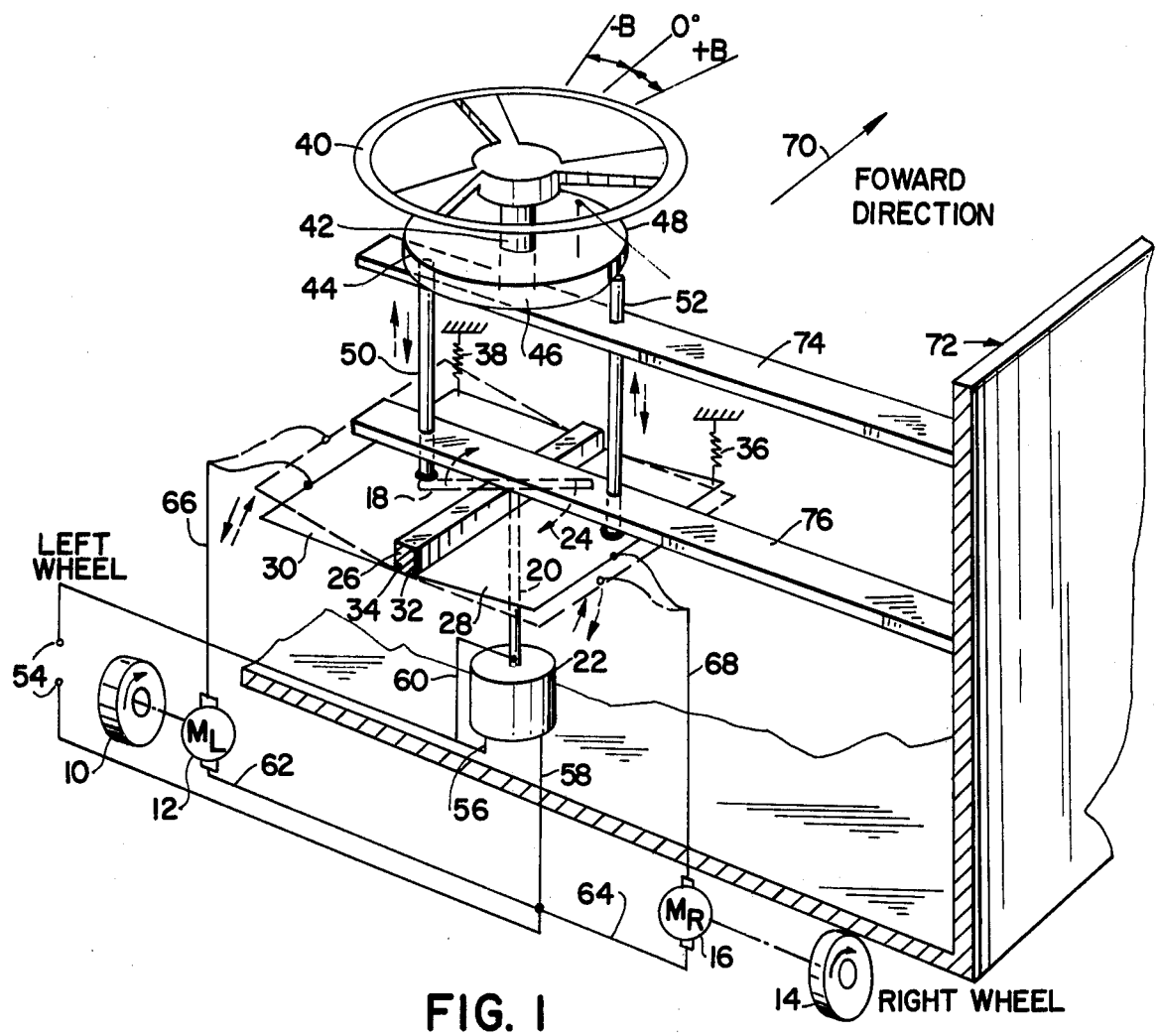
FIG. 1 is an isometric view schematically showing a first embodiment of the control system in accordance with the present invention.

Referring now to FIG. 1, there is shown one embodiment of the present invention for carrying out the aforementioned control. The vehicle comprises a left wheel 10, operated by means of a left drive motor 12 and a right wheel, 14 controlled by means of its own independent motor 16. The motors can typically be connected to drive the wheels by means of shafts, gears, or other well known vehicle components. The operation of the left and right motors 12, 16 are controlled by the amount of current flowing to the motors. More current flowing to the motor will cause it to rotate faster, while reduced current slows it down. The amount of current flowing to the motors are in turn controlled by means of the contact relationship of two contacts serially placed between an energy souce and the motors. When greater amounts of contact over an average period of time is provided, then increased current will flow. On the contrary, reduced contact as averaged over a period of time will provide a reduced amount of current and accordingly slower operation of the motor.

The first contact includes the elongated wiper arm 18 which is mounted on shaft 20 which in turn is driven by means of a control motor 22. Rotation of the motor 22 causes the wiper arm 18 to rotate about its central axis in a circular direction as shown by means of the arrows 24. The second contact is provided by means of a pivoted plate arrangement. A brace 26 is positioned at approximately the mid point of the rotating wiper arm 18. Two plates 28,30 are respectively placed outboard of the brace 26 and each are respectively pivotable with respect to the brace. Plate 28 is connected about shaft 32 and can pivot thereabout. Plate 30 in turn pivots about its pivot axis 34. The plates are generally biased by means of the respective springs 36, 38 into an upward position.

The direction of movement of the vehicle is controlled by means of the drive wheel 40 whose shaft 42 interconnects to a cam 44. The cam is of circular arrangement having its crest formed at one portion of its circumference by means of a larger thickness 46. The dwell portion is formed by a thinner section 48 diametrically opposed to the crest portion. The interconnecting sections of the cam are continuously graded. In this manner, a symmetrical cam arrangement is provided having diametrically opposed thinner and thicker portions and across the orthogonal diameter approximately equal portions.

The cam followers are formed by means of the two drive rods 50, 52. Drive rod 50 is positioned so that its bottom end couples against the pivot plate 30 while drive rod 52 is coupled to pivot plate 28. The two drive rods are positioned in diametrically opposed relationship with respect to the cam. In this manner, when one drive rod engages the crest, the other drive rod engages the dwell. On the other hand, across the other diameter the drive rods can have equal portions of the same surface abutting it. When one drive rod is at the thickest portion of the cam, it will push down on its associated pivot plate moving it in a downward direction against the biasing spring. On the other hand, the other drive rod will then be at its highest position, permitting its pivot plate to move upwardly to its highest position. The movement of the pivot plate upwardly and downwardly place them in greater or lesser contact relationship with the rotating wiper arm 18 which is caused to rotate therebeneath.

An electric source is connected to the terminals 54 and can be of either an AC or DC type. The electrical source supplies and drives the motor 22 by means of lines 56, 58. At the same time, one end of the electrical source is coupled by means of line 60 to one of the contacts specifically the wiper arm which is formed of conductive material. Although the contact is to the shaft which in turn leads to the wiper arm, it could also be connected directly to the wiper arm so that the shaft need not be conductive.

One end of the energy source is connected to one side of both motors 12 and 16 along respective lines 62, 64. The other end of motor 12 is connected by means of line 66 to the pivoted plate 30 while the other side of motor 16 is connected by means of line 68 to the pivoted plate 28.

In operation, current passes from the energy source to the first contact which is the wiper arm. The wiper arm rotates and makes continuous contact with both pivot plates 30 and 28 sending current to these conductive plates. The current passes through the respective plates and then from plate 30 through line 66 to the other end of the motor 12 and then back into the energy source along line 62. At the same time, current flow through the other plate 28 through line 68 to the motor 16 and then through line 64 back to the energy source. It will therefore be appreciated that both the left motor 12 and right motor 16 operate by means of the same energy source.

In order to make a left or right turn, the motors must be made to operate at respective different speeds by causing different amounts of current to flow in each of the motors. This is achieved by turning the steering wheel conventionally in the direction of the turn. For example, in order to make a right turn, the steering wheel would be turned from its zero angle position, which indicates a forward direction, as shown by arrow 70 towards the right a number of degrees indicated by +B. In turning the steering wheel to the right, the thinner portion of the cam will approach the drive rod 52 causing it to move upward whereby the plate 28 will also move upward out of complete area contact relationship with the rotating wiper arm. As a result, over the period of a sweep of the wiper arm, the time that the wiper arm is in contact with plate 28 will be less and less current will be caused to flow into the right motor 16. On the contrary, the thicker portion of the cam will come in contact with the drive rod 50 causing it to move downwardly whereby the plate 30 comes into greater area contact with the rotating wiper arm 18 whereby for each period the wiper arm will be in contact with the plate 30 over a greater period of time thereby causing a greater amount of current to flow through the left motor 12 whereby it will operate at a faster speed.

Figure 2:
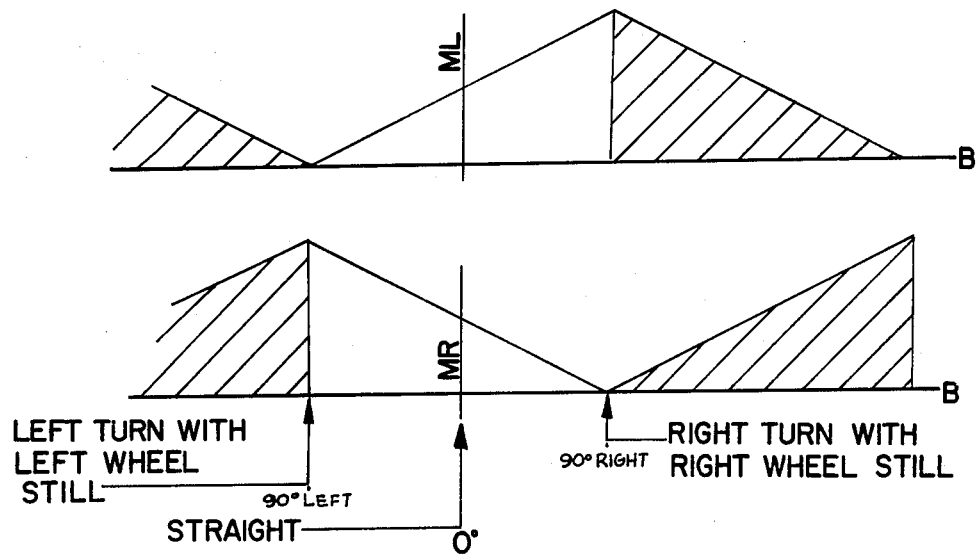
FIG. 2 shows curves for use in explaining the operation of the embodment of FIG. 1.

With reference now to FIG. 2 a better understanding of the operation can be seen. For the position shown in FIG. 1, wherein the steering wheel is in its foward direction at its zero position, the vehicle will move foward in a straight direction. At this point, both drive rods are approximately at the same height and approximately average current flowing to both motors and these currents are equal. This is shown by the straight position at the zero degree mark. When the steering wheel is turned toward the right, the left motor increases in speed as shown by the upward direction of the top curve going to the right of the zero degree mark while on the contrary the right wheel will reduce in speed as shown by the declining portion of the curve going toward the right of the zero degree axis. This condition will continue until the steering wheel has been turned 90° to the right. At this point, the right wheel will no longer receive any current and will stop rotating. On the contrary, the left wheel will be at its maximum position. This will achieve the right turn as desired.

In a similar manner, in order to achieve a left turn, the steering wheel is turned to the left whereby the left wheel reduces its speed until at 90° it reaches its still position. On the contrary, the right wheel continues increasing its speed until it reaches its maximum at 90° At this point, right turn movement will be achieved.

It should be noted that the portion of the curve greater than a 90° movement to the right or to the left is shown in cross hatched section. This is because when the steering wheel is turned more than 90° a reversal of the direction of the motor will take place and the vehicle will operate contrary to conventional manner. For example, greater than 90° it is noted that the right wheel will again commence its operation even passing the speed of operation of the left wheel which is declining. Therefore, as the wheel would be continually turned past 90° instead of turning to the right, the vehicle will actually start turning left. This is contrary to the conventional desired direction of turns. In a similar manner, past 90° to the left, the vehicle will again turn in the wrong direction as compared to convention. Therefore, this portion is shown in cross hatch indicating that that portion of the curve is not to be used. In order to restrict movement of the steering wheel to a plus or minus 90° movement, stops could be placed on the steering wheel so that only this angular section of the wheel would be used. It should be understood, however, that even though a restricted angular movement of the steering wheel is provided, complete rotation of the vehicle is achieved within that restricted movement.

Although the curve shown in FIG. 2 includes straight line sections between the maximum and minimum, the actual curves would be dependent upon the graded cam surface between the maximum and minimum. For a linear gradation between the dwell and crest portion, such a linear curve could be achieved. However, other shapes of curves could be achieved by means of controlling the cam surface. However, the maximum and minimum would occur as indicated so long as the crest and dwell portions are diametrically opposed.

By means of a schematic showing, FIG. 1 indicates the control system contained within a housing shown generally at 72 and includes bearing support beams 74, 76 for holding the drive rods 50, 52. However, it is understood that other structural support would be included for holding the various components within such housing 72. Similarly, the steering wheel could be placed in a conventional position in the vehicle adjacent the dashboard whereby the usual control of the vehicle is achieved by means of a standard steering wheel with all of the control system as described contained within a housing in the vehicle.

It should be noted that the amount of current which is selectively controlled to each of the motors occurs as a result of the contact relationship between the wiper arm and the pivoted plates. Such contact relationship occurs as an average over a period of time whereby a closer contact produces greater current and reduced contact produces lesser current.

Figure 3:
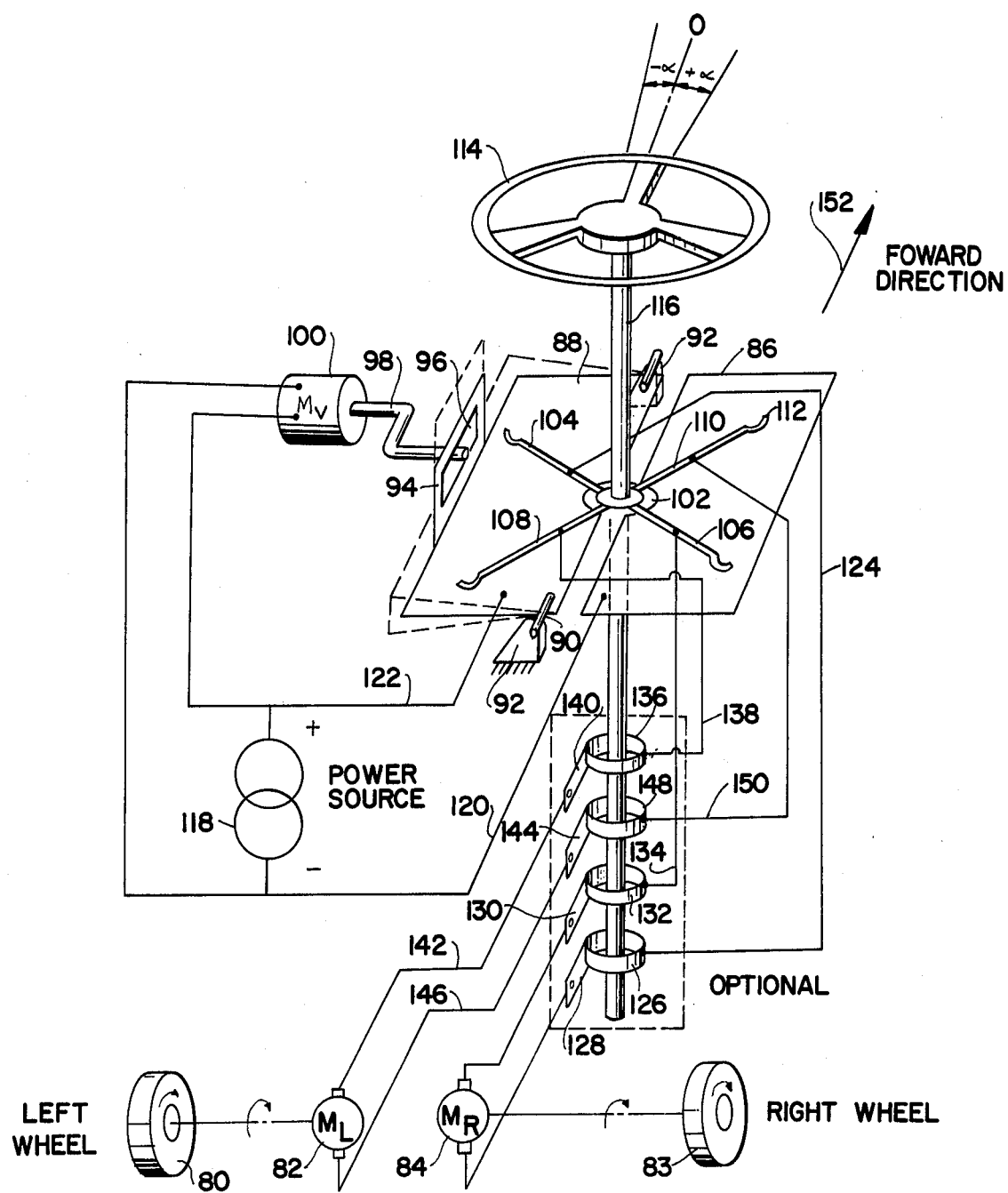
FIG. 3 is an isometric view schematically showing a second embodiment of the control system in accordance with the present invention.

Referring now to FIG. 3, there is shown another embodiment of the present invention. In this embodiment there is again provided a left wheel 80 driven by a left drive motor 82 and a right wheel 83 driven by a right drive motor 84. However, in this embodiment the two contact means are reversed. The first contact means includes a fixed plate 86 as well as a pivoted plate 88 which can pivot about the shaft 90 supported on a pair of bearing blocks 92. The two plates 86, 88 are of conductive material and are spaced apart from each other so as not to be in electrical contact with one another. The plate 88 includes an upwardly extending yoke 94 having a slot therein 96 which can receive a crank 98 of a control motor 100. As the control motor 100 operates, the crank 98 rotates causing the yoke 94 to move up and down thereby making the plate 88 pivotally vibrate about the shaft 90 as shown by the dotted lines.

The second contact comprises wiper arms which are spaced from the fixed and pivoted plates 86, 88. The wiper arm system includes a non-conductive center ring 102 with four radial arms orthogonally extending therefrom. The radial arms are divided into two pairs whereby a first pair of diagonally opposing arms 104, 106 are interconnected electrically through one of the drive motors and the second pair of diagonally opposing wiper arms 108, 110, are respectively interconnected across the other of the drive motors. Each of the wiper arms have a curved remote edge with an upwardly extending finger 112 to make better contact to the fixed and fibrating plates 86, 88.

A steering wheel 114 is provided which is connected to a shaft 116 which is coupled to the center ring 102 of the wiper arms. As the steering wheel is turned in either a right or left direction the wiper arms are simultaneously rotated in that direction.

A source of DC energy 118 is connected across the control motor 100 to energize it. The source of DC energy is also connected between the fixed plate along line 120 and the pivoted plate 122.

Wiper arm 104 is connected by means of lead 124 to a slip ring 126 which contacts a brush 128 which in turn is interconnected to one side of the right drive motor 84. The other side of the drive motor is connected to the brush 130 which contacts the slip ring 132 which in turn connects to the diagonally opposed wiper arm 102 along line 134. Similarly, the other pair of diagonally opposed wiper arms interconnect the other drive motor. Specifically, the wiper arm 108 is electrically connected to slip ring 136 through line 138. Brush 140 contacts the slip ring and is interconnected along line 142 to one side of the left motor 82. The other side of the left motor contacts the brush 144 along line 146 which contacts the slip ring 148. Lead line 150 connects the slip ring 148 with the other diagonally opposed wiper arm 110.

Although slip rings and brushes have been shown to interconnect the rotating wiper arm with the drive motor, it is understood that this arrangement is optional and direct cable could be utilized wherein the cable itself would be slightly twisted as the wiper arm rotates.

Figure 4:
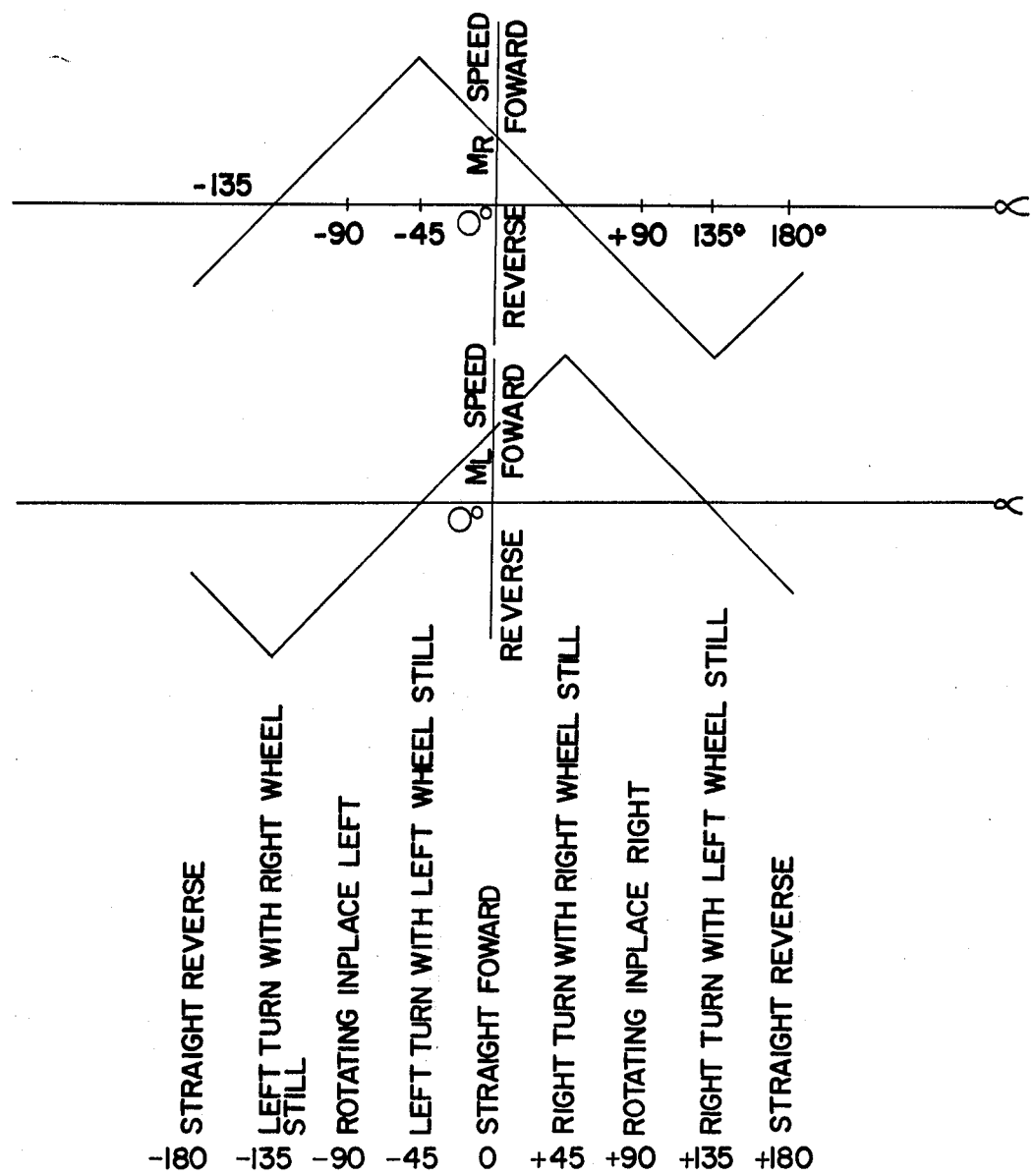
FIG. 4 shows curves for use in explaining the operation of the embodiment shown in FIG. 3.

In operation, and with respect to FIG. 4 for aiding in the explanation, the direction of the vehicle is shown by the arrow 162, at which time the steering wheel is in its zero degree position. At this point, the wiper arms are in the position as shown in FIG. 3 wherein they are symmetrically positioned with respect to both the fixed plate and the vibrating plate. When a right turn is desired, the steering wheel will be turned to the right a number of degrees indicated by the letter alpha α. As the steering wheel is rotated to the right the wiper arms will be rotated so that wiper arm 104 moves in a clockwise position towards the edge of the vibrating plate while the wiper arm 108 moves to assume a position almost perpendicular to the vibrating plate. As a result of this movement, the area contact relationship between the vibrating plate 88 and the wiper arm 104 will occur over a lesser period of time during each period of oscillation of the plate 88 while the area contact relationship between the vibrating plate 88 and the wiper arm 108 will occur over a greater period of time during each period of oscillation of the plate 88. The wiper arm 104 feeding the right motor will therefore provide less current to the right motor and on the contrary the wiper arm 108 feeding the left motor will provide increased current to the left motor. As a result, with the left wheel turning faster than the right wheel, the vehicle will turn to the right in accordance with the direction in which the steering wheel has been turned, as is conventional. This condition will continue until the wiper arm reaches the interspace between the fixed and vibrating plate at which time no current will be provided to the right motor and it will remain still. The left wheel, on the other hand, will then reach its maximum speed having the maximum amount of current sent to it because of the maximum area contact relationship between its wiper arms and the vibrating plate for the maximum amount of time during each period of oscillation.

As is noted in FIG. 4, at the zero degree position both motors are operating at about the same speed. When the steering wheel is turned to the right, the right motor will decrease in speed with the left motor increasing until 45° at which the right motor will remain still with the left motor operating at maximum speed. In a similar manner, when a left turn is desired the steering wheel will be turned towards the left and at minus 45° the left motor would remain still with the right motor reaching its maximum speed.

With the embodiment shown in FIG. 3, contrary to the first embodiment, it is possible to continue moving the steering wheel and obtain both forward and reverse operation of the motors. Specifically, as shown in the curves of FIG. 4, when the steering wheel continues past its 45° position to the right, the right motor will now begin operating in reverse direction and the left motor start reducing its speed. However, because of the reverse operation of one of the motors the vehicle would continue rotating to the right in accordance with the direction in which the steering wheel has been turned. This would continue until the steering wheel were turned a complete 180° turn at which time the vehicle would operate in reverse. Similarly, in connection with a left turn, when the steering wheel is turned in the left direction the vehicle would turn left and then continue rotating to the left until finally with the steering wheel at a minus 180° turn there would again be a complete reversal in the direction of operation of the vehicle.

It is noted that in FIG. 3, a DC power source is utilized and because of the separate wiper arms the direction of flow of current to the various motors can be controlled to have them operate in the forward or reverse directions.

Although FIG. 4 showed linear curves between the maximum and minimum points, it will be appreciated that the actual curves may not be linear, and complex relationships may actually exist between the maximum and minimum values. However, the maximum and minimum values would occur at the specific angular positions identified and the direction of curvature would be as indicated although it may not be an exact linear relationship. It should also be under stood that the increase and decrease in contact relationship between the vibrating plate and the rotating wiper arm is a time average relationship over a series of cycles of operation of the drive motor. Still further notice is taken of the fact that although pulses have been shown to be applied by the means of a control motor, in fact these pulses can also be applied by hand. Additionally, while a left and right wheel have been shown to be driven by respectively the left and right drive motors, these two motors could be interconnected to a single device which would then be movable in any direction as a result of the X and Y component velocities of the two motors.

It should be additionally understood that although the drive motors of this invention are illustrated to be electric motors, that other devices could be substituted, such as a hydraulic motor followed by an electric clutch, which would be pulsed on and off for controlling the flow of power in this invention. It should therefore by understood, that the term "motor" or "drive motor" is being used in a very broad sense to mean a drive device which can be pulsed on and off in response to a control signal.

There has been disclosed heretofore the best embodiments of the invention presently contemplated. However, it is to be understood that various changes and modifications may be made thereto without departing from the spirit of the invention.

I claim:

1. A control system for a dual-wheel drive, comprising;
   first and second drive motor independently controllable by regulating the amount of current respectively flowing thereto:
   first and second contact means, each contact means respectively having a direction of movement relative to the other contact means;
   said first contact means serving as a common electrical supply terminal means for both said first and second drive motors;
   said second contact means having separate terminal means coupled respectively to said first and second drive motors to supply them with current;
   control motor means for providing continuous periodic movement of said first contact means, and
   control wheel means for selective positioning said second contact means with respect to said first contact means, for thereby respectively positioning said separate terminal means with respect to said common supply terminal means whereby the time duration of the respective contact relationships between said separate terminal means and said common supply terminal means during each periodic movement of said first contact means is controlled to thereby regulate the amount of current flowing to each drive motor.

2. A control system as in claim 1 and wherein said first contact means comprises an elongated wiper arm, said control motor means has an output shaft coupled to said wiper arm to rotate it about its central axis, said second contact means comprises plate means having pivotal movement with respect to said rotating wiper arm, and wherein said control wheel means comprises means for pivoting said plate means to cause a selectively controlled contact relationship between said plate means and said rotating wiper arm.

3. A control system as in claim 2 and wherein said plate means comprises an elongated central member, first and second conductive plates outwardly extending from said central member and pivoted therefrom, electrical connections respectively connecting said first conductive plate with said first drive motor and said second conductive plate to said second drive motor, a source of energy coupled to said wiper arm, said wiper arm being of conductive material, whereby current flows from said wiper arm through said first and second conductive plates respectively to said first and second drive motors, and wherein the respective amount of current flowing is controlled by the contact relationship between said wiper arm and each of said first and second conductive plates.

4. A control system as in claim 3 and wherein said control wheel means comprises: a steering wheel, a circular cam operatively coupled to said steering wheel and including a thicker crest portion, a diametrically opposed thinner dwell portion and a continuously graded thickness therebetween; first and second drive rods respectively coupled to said first and second conductive plates; biasing means coupled to said first and second conductive plates for biasing them in opposition to said drive rod; said drive rods riding said circular cam in diametrically opposed positions, whereby as said steering wheel is turned said first and second contact plates are pivoted with respect to said rotating wiper arm in opposed relationship to each other.

5. A control system as in claim 1 and wherein said first contact means comprises a plate pivoted about a fixed shaft, said control motor means being coupled to said pivot plate for pivotally vibrating it about the shaft, said second contact means comprises rotatable wiper arm means positioned with respect to said pivoted plate, and wherein said control wheel means comprises means for rotating said wiper arm means with respect to said vibrating plate to cause a selectively controlled contact relationship between said wiper arm means and pivoted plate.

6. A control system as in claim 5 and wherein said plate means further comprises a fixed plate positioned in a first plane, said pivoted plate separated from said fixed plate and vibrating with respect to said first plane, said wiper arm means comprising a non-conductive center ring positioned between said fixed plate and said pivoted plate, four conductive wiper arms radially extending from said center ring in orthogonal relationship and symmetrically located with respect to said fixed plate and said pivoted plate, a first pair of said wiper arms diagonally opposed to each other being electrically connected to said first drive motor, the remaining second pair of diagonally opposed wiper arms being electrically connected to said second drive motor, a source of energy coupled between said fixed plate and said pivoted plate, whereby current flows from said fixed plate and said pivoted plate through said first and second pairs of diagonally opposed wiper arms respectively to said first and second drive motors, and wherein the respective amount of flowing currents are controlled by the contact relationship between said vibrating pivoted plate and said wiper arm.

7. A control system as in claim 1 and wherein said control motor means drives a crank, and further comprising yoke means having a slot therein, said yoke extending from said pivoted plate and said slot receiving said crank, whereby rotating of said crank causes said pivoted vibration of said pivoted plate.

8. A control system as in claim 6 and wherein said control wheel means comprises: a steering wheel, a shaft coupling said steering wheel to said center ring, whereby as said steering wheel is turned said first and second pairs of diagonally opposed wiper arms are rotated with respect to both said fixed plate and said vibrating pivoted plate in opposed relationship to each other.

9. A control system as in claim 6 and further comprises first and second slip rings respectively connected to said first diagonally opposed pair of wiper arms, first and second brushes selectively connected across said first drive motor and respectively contacting said first and second slip rings, third and fourth slip rings respectively connected to said second diagonally opposed pair of wiper arms, and third and fourth brushes electrically connected across said second drive motor and respectively contacting said third and fourth slip rings.

10. A control system as in claim 8 and wherein said energy source is a source of DC power, whereby said first and second drive motors can operate both in a forward and reverse direction.

* * * * *